(12) United States Patent
Halén

(10) Patent No.: US 7,672,318 B2
(45) Date of Patent: Mar. 2, 2010

(54) ADAPTABLE NETWORK BRIDGE

(75) Inventor: Joacim Halén, Sollentuna (SE)

(73) Assignee: Telefonaktiebolaget L M Ericsson (Publ), Stockholm (SE)

(*) Notice: Subject to any disclaimer, the term of this patent is extended or adjusted under 35 U.S.C. 154(b) by 959 days.

(21) Appl. No.: 10/977,724

(22) Filed: Oct. 29, 2004

(65) Prior Publication Data

US 2005/0111434 A1    May 26, 2005

Related U.S. Application Data

(60) Provisional application No. 60/517,737, filed on Nov. 6, 2003.

(51) Int. Cl.
     *H04L 12/28*    (2006.01)

(52) U.S. Cl. .................. 370/401; 370/465

(58) Field of Classification Search ............... None
See application file for complete search history.

(56) References Cited

U.S. PATENT DOCUMENTS

| | | | |
|---|---|---|---|
| 5,396,493 A | 3/1995 | Sugiyama et al. | |
| 5,515,376 A | 5/1996 | Murthy et al. | |
| 5,790,554 A | 8/1998 | Pitcher et al. | |
| 5,959,976 A | 9/1999 | Kuo et al. | |
| 6,084,878 A * | 7/2000 | Crayford et al. | 370/389 |
| 6,151,316 A * | 11/2000 | Crayford et al. | 370/356 |
| 6,356,551 B1 * | 3/2002 | Egbert | 370/389 |
| 6,522,629 B1 * | 2/2003 | Anderson, Sr. | 370/236 |
| 6,526,044 B1 * | 2/2003 | Cookmeyer et al. | 370/352 |
| 7,031,325 B1 * | 4/2006 | Williams | 370/401 |
| 7,457,279 B1 * | 11/2008 | Scott et al. | 370/352 |
| 7,474,666 B2 * | 1/2009 | Kloth et al. | 370/401 |
| 2002/0196796 A1 * | 12/2002 | Ambe et al. | 370/401 |
| 2003/0123387 A1 | 7/2003 | Jackson | |
| 2004/0095928 A1 * | 5/2004 | O'Neill et al. | 370/389 |
| 2005/0232274 A1 * | 10/2005 | Kadambi et al. | 370/392 |

FOREIGN PATENT DOCUMENTS

| | | |
|---|---|---|
| EP | 0508886 A | 10/1992 |
| WO | WO 00/56024 A | 9/2000 |

OTHER PUBLICATIONS

John Hart, Extending the IEEE 802.1 MAC Bridge standard to remote bridges, Jan. 1988, IEEE, IEEE Network, vol. 2, Issue: 1, pp. 10-15.*

* cited by examiner

*Primary Examiner*—Jayanti K Patel
*Assistant Examiner*—Hooman Houshmand

(57) ABSTRACT

An adaptable network bridge such as an Ethernet bridge includes a Rule Engine that processes data frames according to a set of switching rules. Each switching rule identifies a type of frame to which the rule applies, and how the type of frame is to be processed. The bridge also includes means for dynamically adding, subtracting, or modifying the switching rules in response to changes in the bridge's state information, or changes in context information. If the bridge includes a plurality of input/output ports, the Rule Engine may include a plurality of sets of switching rules, with each set of switching rules being applicable to a different port in the bridge. In this way, different network providers can share the same equipment, but have different network behavior.

17 Claims, 3 Drawing Sheets

ADAPTABLE NETWORK BRIDGE

CROSS-REFERENCE TO RELATED APPLICATIONS

This nonprovisional application claims priority under 35 U.S.C. § 119(e) on U.S. Provisional Application No. 60/517,737 entitled, Programmable Bridge, filed Nov. 6, 2003, the disclosure of which is incorporated herein in its entirety.

BACKGROUND OF THE INVENTION

1. Technical Field of the Invention

The present invention relates generally to digital communication systems. More particularly, and not by way of limitation, the invention is directed to an adaptable network bridge having a Rule Engine that simplifies adapting the bridge to dynamically changing conditions.

2. Description of Related Art

Ethernet is a layer-2 packet-based transmission protocol that is primarily used in local area networks (LANs). Ethernet is the common name for the Institute of Electrical and Electronics Engineers (IEEE) 802.3 industry specification. Data is transmitted in Ethernet frames. Each frame includes a preamble with 64 bits utilized for synchronization. A Start of Frame Delimiter (SFD), a destination address, a source address, and a length/type identifier follow the preamble. Media Access Control (MAC) client data, together with a Packet Assembler/Disassembler (PAD) may vary in length from 46 to 1500 bytes (octets). A Frame Check Sequence (FCS) adds four more octets. Higher-level protocols reside in the content part of the frame. The frame size is counted from the destination address to the FCS, inclusive, and thus may vary between 64 and 1518 octets, not including a Virtual Local Area Network (VLAN) tag, which adds 4 octets.

Today most packet-based networks are built on Ethernet technology, as it is a cheap and reliable technology with good performance. Ethernet has been used in office networks for a long time and is now used to build Wide Area Networks (WANs) as well as small networks in homes. The communications industry is now expanding the use of Ethernet to what is called "Public Ethernet" where millions of users are connected in the same network. Unfortunately, Ethernet does not scale to such large networks due to flooding of broadcasted messages. Some solutions have been proposed, but these solutions require modifications to the existing standards if they are to be implemented on standard equipment.

Ethernet bridging is a way to connect networks together to form a larger network. The standard for bridging is ANSI/IEEE 802.1d, which is hereby incorporated by reference herein. A bridge is a way to connect two separate network segments together in a protocol-independent way. Packets are forwarded based on Ethernet address, rather than IP address. Since forwarding is done at Layer 2, all protocols can go transparently through a bridge.

There are basically two approaches to adding new functionality to Ethernet bridges (and other Ethernet equipment as well): standardization thru IEEE, or proprietary solutions, which make the equipment non-standard. Adding new functionality and behavior to IEEE 802.1d MAC bridges, better known as Ethernet switches (or other Ethernet equipment), is a difficult and time-consuming process without any guarantees of success. Each new function must be proposed to and scrutinized by an IEEE standardization group (an existing working group or a new group has to be accepted and established). If one is lucky, the proposed function is accepted and added to the standard. However, since each new function requires a change in the standard, there is reluctance to add new functions. If the proposal is rejected, one is limited to a proprietary solution on non-standard equipment. The members of the standardization groups come from different vendors and other organizations, and although they are supposed to act in the interest of IEEE and the entire community, they may also act on agendas from their own organization/company that might be in conflict with the proposed functionality, thereby turning it down. It should also be noted that if a new function is added to the standard, it is then up to the different vendors to add the standardized functionality. A feature may be standardized but not made mandatory.

The proprietary approach also has its drawbacks. For example, programmable network processors have been available for some time, and bridges may be purchased off the shelf containing programmable network processors. Proprietary solutions can be implemented on these. However, these network processors are vendor specific, and the solution will only work on that network processor or processor family. The solution will not be portable, and it will not be possible to run it on other vendors' equipment. Additionally, programming a network processor is done at a very low level, basically in assembly language, and the programming model is hard, requiring special skill. It should also be noted that a proprietary solution will make the equipment non-standard, and customers are more reluctant to buy non-standard equipment. There might also be inter-operational problems with other equipment.

SUMMARY OF THE INVENTION

The present invention is an adaptable network bridge having a Rule Engine that simplifies the adaptation of the bridge to dynamically changing conditions related, for example, to network conditions and user context. Simplicity is achieved by specifying how data frames should be processed and switched in terms of switching rules. Flexibility is achieved by enabling dynamic loading and updating of rules in the bridge via a protocol. In addition, one bridge may generate or modify rules for loading at another, neighboring, bridge. In a preferred embodiment, the bridge is an Ethernet bridge.

Thus, in one aspect, the invention is directed to an adaptable network bridge that includes a Rule Engine that processes data frames according to a set of switching rules. Each switching rule identifies a type of frame to which the rule applies, and how the type of frame is to be processed. The bridge also includes means for dynamically modifying the switching rules. In particular, the rules may be dynamically loaded and updated, for example, in response to changes in the bridge's state information, or changes in context information. In another embodiment, the bridge includes a plurality of input/output ports, and the Rule Engine includes a plurality of sets of switching rules, wherein each set of switching rules is applicable to a different port in the bridge.

In one aspect the rules are forced on the switch by external units such as a Network Management System (NMS).

In a further aspect, a switch generates or modifies rules that are forced on other switches.

In yet another aspect, the invention is directed to a method of processing and switching Ethernet frames in an adaptable Ethernet bridge. The method includes the steps of defining a set of switching rules for the adaptable Ethernet bridge; receiving a given frame in the bridge; determining whether any of the rules are applicable to the given frame; and upon determining that one of the rules is applicable to the given frame, processing and switching the frame according to the applicable rule. The switching rules may be dynamically added, subtracted, or modified, for example, in response to changes in state or context information.

An important aspect of the invention is how the extended state vector can be utilized in new ways in the switching process. The switching process can be controlled and adapted in new ways allowing completely new ways to control networks.

BRIEF DESCRIPTION OF THE DRAWINGS

In the following, the essential features of the invention will be described in detail by showing preferred embodiments, with reference to the figures of the attached drawings.

DETAILED DESCRIPTION OF THE INVENTION

Figure 1:
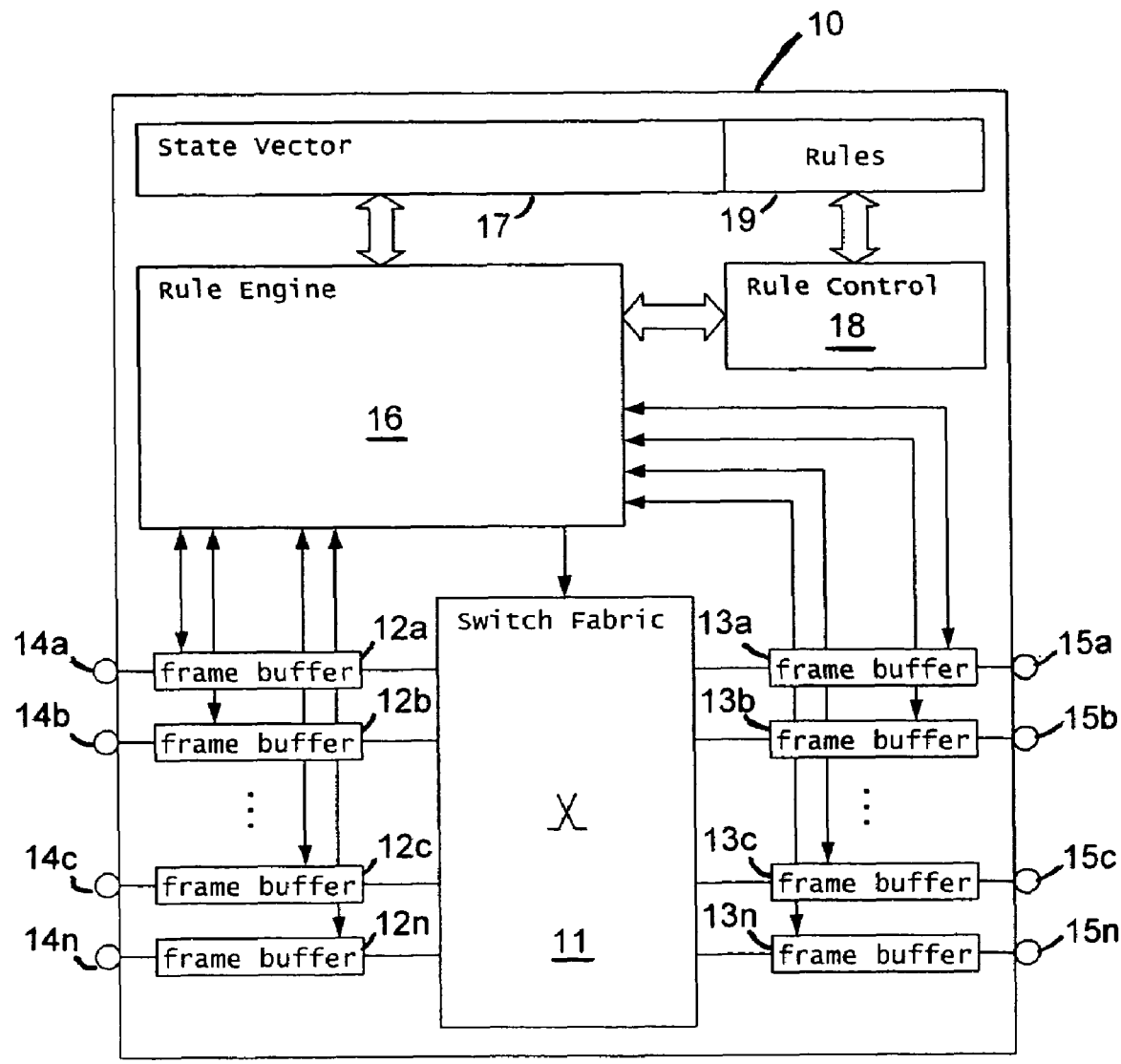
FIG. 1 is a simplified block diagram of a Rule Engine utilized in the adaptable network bridge of the present invention.

In the following description, for purposes of explanation and not limitation, specific details are set forth, such as particular embodiments, circuits, signal formats etc. in order to provide a thorough understanding of the present invention. It will be apparent to one skilled in the art that the present invention may be practiced in other embodiments that depart from these specific details.

In existing Ethernet bridges, there are two identifiable phases in the switching process. In the first phase, parts of the frame header are checked for specific information. For example, the destination address of each frame may be checked against a forwarding table, priority bits, VLAN tags, and the like. In the second phase, different actions are taken within the bridge depending on the result of this check. For example, the frame may be sent to the port pointed to in the forwarding table, or the frame may be sent to all ports except the originating port, and so on. These steps characterize a process in which a frame is put through a filter that selects the action to take. Another important element is that the bridge stores and retrieves information in the form of a simple state vector in a forwarding table (i.e., memory), which the bridge is using in the process. However, the different parts of this process are fixed and may not be altered.

The present invention is based on a generalization of this switching process that adds several new key aspects to switching, enabling new ways of adapting and controlling the switching process as well as new ways to control Ethernet networks. The invention provides an adaptable Ethernet bridge having a Rule Engine that simplifies the addition or modification of functionality within the bridge. One of the purposes of the adaptable bridge is to provide a simple solution whereby anyone with reasonable skill can implement and add new functionality in a standardized way on standard equipment. Simplicity is achieved by specifying how Ethernet frames should be processed and switched in terms of switching rules. Flexibility is achieved by enabling dynamic loading and updating, inspection, and prioritization of rules in bridges via a protocol.

The generalized switching process consists of the Rule Engine processing Ethernet frames by applying the switching rules. A switching rule encapsulates a specific switching behavior that describes the filter and action processes together with the state vector. A switching rule thus consists of three parts:

1) A filter function that can filter any part or parts of a frame. The purpose of the filter is to decide if the rule is applicable to a given frame. In other words, the filter works as a predicate function on frames. In this decision process information in the state vector may be used.
2) An action function that describes how a frame header (or the entire frame) should be transformed and how the frame should be switched, i.e. to which port or ports the frame should be sent. In this process the action function may alter the state vector.
3) A state vector that the filter function and the action function can use in the switching process.

The switching rule can also contain other information such as version, priority specification, vendor information, and the like.

The state vector is an abstraction of several parts:

1) A local memory for a rule or a set of rules where rule-specific data can be stored and altered. Specific "management rules" make it possible to access that data from, for example, a management system.
2) A global bridge memory where bridge-specific data applicable to and accessible by all rules can be stored and altered. One example is the port-forwarding table.
3) Access to a set of bridge resources that can be implemented as library functions. Some examples are a function to retrieve the source port of the frame processed, a function that provides timestamps, counters and timers, and functions that describe the traffic flows and load in the bridge. The invention is not limited to these examples; other functions may be identified by those skilled in the art.

A switching rule describes the types of frames that match the rule and how these frames should be processed (e.g., switched or transformed before switching). Each incoming frame is checked against the set of rules stored in the bridge. If a rule matches, the frame is processed and switched according to the specification in the rule. If no rule matches the frame, a default rule may be utilized, or the frame may be dropped.

With the concept of rules, the switching process is defined as a simple and understandable programming model. Standardizing rule language and making it possible to dynamically load new rules in a bridge also makes it possible to add new functionality, adapting standard equipment to the needs at hand. If some functionality becomes obsolete, that functionality can be removed by removing the rule or set of rules implementing it.

A powerful extension is to allow different rule sets to be valid for different ports enabling, for example, different network providers to share the same hardware but have different network behavior. Different embodiments of this extension include: a rules control mechanism that selects and prioritizes available rule sets based on port, time of day, load, and the like. Alternatively, this kind of information may be described in the filter functions, and the Rule Engine tries all rules until it finds a match.

Yet another powerful extension is to allow rules that monitor the state vector instead of being matched against Ethernet frames. That is, the filter function monitors the state vector, and when some condition is fulfilled, the action function is invoked. The monitoring process can be implemented by regularly processing these rules in the Rule Engine or in a separate Rule Engine.

Note that allowing the filter and action functions to have access to a state vector that goes beyond the forwarding table provides new and powerful ways to process and switch frames.

FIG. 1 is a simplified block diagram of an exemplary embodiment of the dynamically adaptable network bridge 10 of the present invention. The adaptable bridge includes many of the same components as existing bridges such as switch fabric 11, frame buffers 12a-12n and 13a-13n, and ports 14a-14n and 15a-15n. In addition, however, the adaptable bridge includes a Rule Engine 16, which replaces the implementation of some or all protocols. The adaptable bridge also includes a state vector memory 17 accessible by the Rule Engine, a rule control function 18, and a rules memory 19 accessible by the Rule Engine through the rule control function. Collectively, these new bridge components enable the adaptable bridge to receive and store rules from external units, store a state vector which may be dependent on external sources, and store rules that are imposed on other bridges.

Hybrid designs having both a Rule Engine and some of the protocols of existing bridges may also be implemented. The Rule Engine has processing capabilities, that is, the Rule Engine can (1) apply the filter function to a frame and calculate the result; (2) apply the action function if the rule matches; (3) access the state vector; and (4) access the other resources of the switch. A frame entering the adaptable bridge through an input port such as port 14a and frame buffer 12a is acted upon by switching rules in the Rule Engine 16, including the filter function, action function, and state vector. The result is a calculated result frame, which is outputted through switch fabric 11, and an appropriate frame buffer and output port such as frame buffer 13a and output port 15a.

The rule control function 18 adds and removes rules dynamically, and orders or prioritizes THE set of rules. The rule control function may be implemented as protocols and secured against unwanted manipulation by using well known techniques intended for that purpose, for example, using digital signatures and encryption. Additionally, the rule control function may include a mechanism to transform (or translate) switching rules in human-readable form to an efficient form understandable by the Rule Engine 16.

The mechanisms to access different bridge resources and state information (i.e., state vectors), mechanisms to access library functions, and a protocol for externally accessing the state information are important parts of the adaptable bridge. The bridge resources and state information may be accessed via, for example, an Application Programming Interface (API). The protocol for externally accessing the state information may be implemented as a set of rules. The state of the bridge can affect switching rules dynamically, that is, a rule can behave differently depending on the current state. For example, frames can be switched differently depending on time of day, traffic pattern, traffic load, and the like. This behavior can also be controlled externally by, for example, a network management system (NMS).

Figure 2:
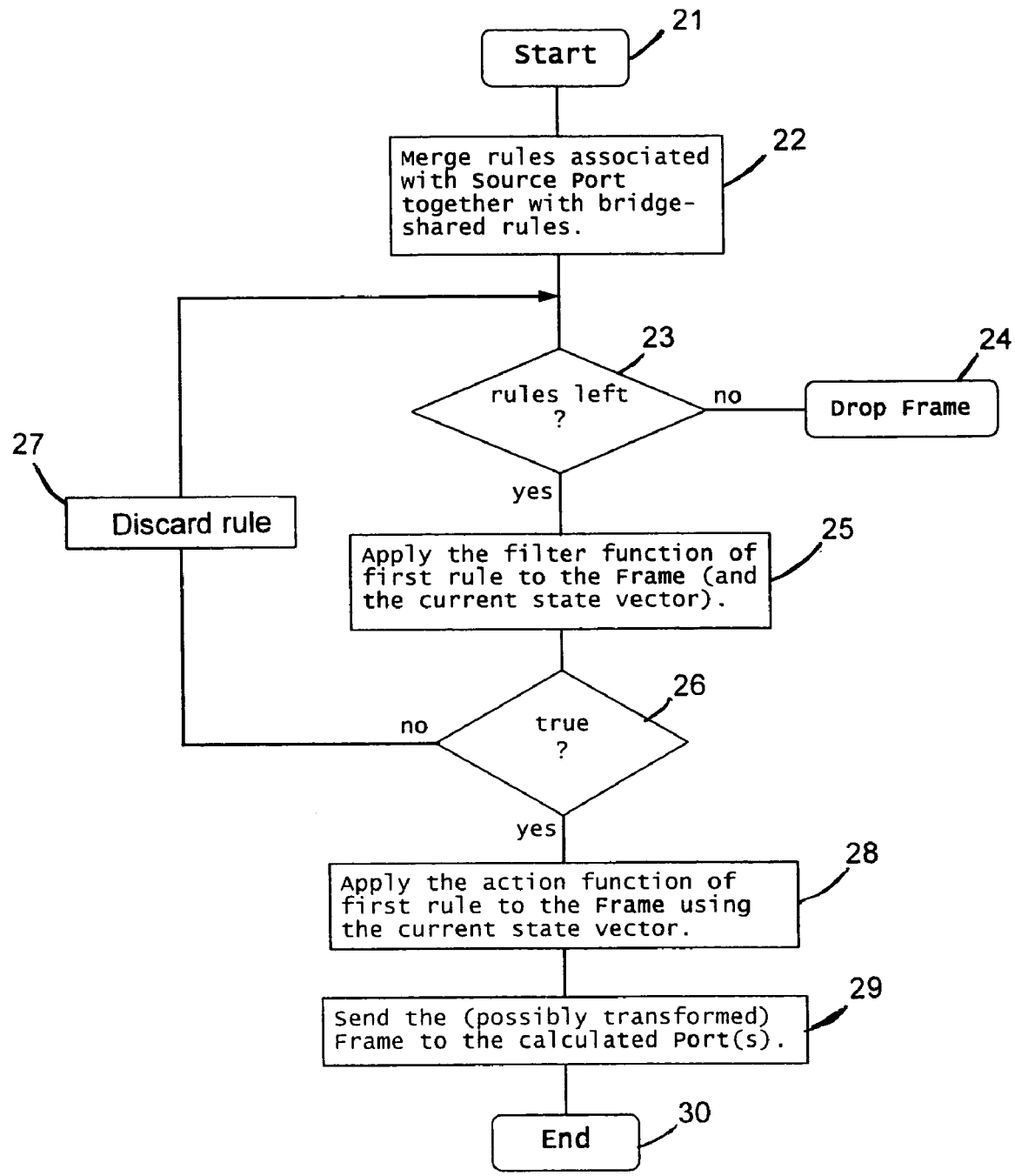
FIG. 2 is a sequence diagram illustrating the steps of a process performed by the Rule Engine.

FIG. 2 is a sequence diagram illustrating the steps of a method of processing an Ethernet frame by the Rule Engine 16. The process starts at step 21 and moves to step 22 where, for each incoming Ethernet frame, the port-specific rules associated with the Source Port are merged with the rules shared among all ports of the bridge (this merge can be done in advance by the priority module as a ordered list). The rules in the list are then tested to determine whether the frame matches the rule. This process begins at step 23, where a determination is made whether there are any more rules left to test. If not, and all the rules have been tested, the frame is dropped at step 24. However, in the case of the first rule, there are rules left to test, so the method moves to step 25 where the filter function of the first rule in the list is applied to the frame. The filter function uses the information found in the frame together with the current state vector to determine whether the frame matches the rule. The filter function is a predicate, so the result at step 26 will be either true (the frame matches the rule) or false (the frame does not match the rule). If the result is false, the rule is discarded at step 27, and the method returns to step 23 where the test is performed on the next rule in the list.

The remainder of the rules are then tested until either no rules are left and the frame is dropped at step 24, or there is a match at step 26, and the method moves to step 28 where the action function of the rule is applied to the frame. The action function may use the library functions, the information in the frame, and the state vector to transform (or modify) the frame. In this process, the action function can use functions to modify the state vector. For example, a counter may be incremented, which counts the number of frames containing a specific high-level protocol coming from the port. At step 29, the action function determines the destination port or ports and sends the (possibly transformed) frame to the determined port or ports. The method then ends at step 30.

Another important aspect of the invention not shown in the sequence diagram is that other resources or modules in the bridge may continuously monitor and change the state vector in parallel. An extended Rule Engine, to the one described, may then invoke rules that, instead of being matched against Ethernet frames, monitor the state vector. When one or more predefined criteria are fulfilled (determined by the filter function), the action function generates new frames containing new rules to be sent to the bridge itself or to nearby bridges altering their behavior.

Figure 3:
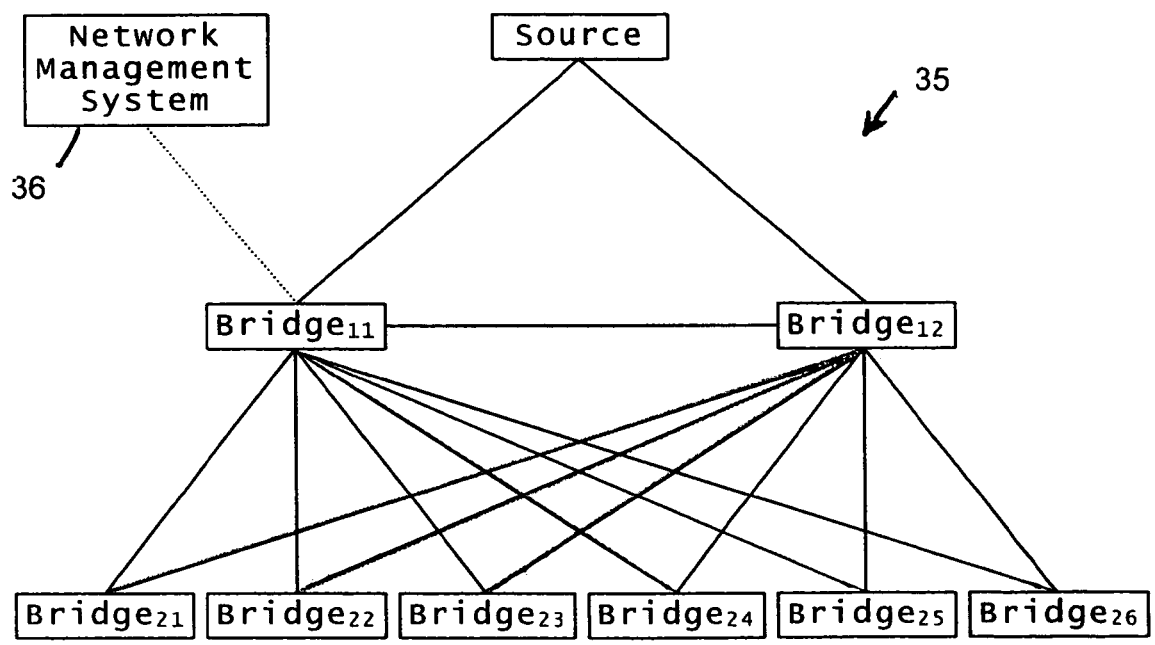
FIG. 3 is an illustration of a network of adaptable Ethernet bridges controlled by a Network Management System (NMS).

FIG. 3 is an illustration of a network 35 of adaptable Ethernet bridges controlled by a Network Management System (NMS) 36. The NMS monitors the state in the bridges and issues rules that adapt the behavior of certain bridges accordingly. For example, if $Bridge_{11}$ becomes heavily loaded with traffic, the NMS may issue a rule that will move some traffic from associated bridges (i.e., $Bridge_{21}$-$Bridge_{23}$) to $Bridge_{12}$. For example, the rule may move every third frame or frames carrying a particular protocol to $Bridge_{12}$. Context information may also be added to the state vector, thereby allowing context to influence switching. Context information may contain, but is not limited to, information about traffic load in nearby bridges, forecasts or predictions of expected traffic, and the like. This feature is of particular interest in a mobile environment.

The NMS 36 is shown connected to the network by a dotted line because the adaptable bridges may automatically generate specific context rules and distribute them to nearby bridges as users move around in the network. When bridges automatically generate rules to other bridges (and to themselves), a self-managed network can be implemented in which bridges exchange rules dynamically. This capability can be used, for example, to setup a particular flow-path, distribute traffic during heavy load, or automatically redirect traffic in the case of network failures. For example, if Bridge11 receives a flow of high priority frames when it is already heavily loaded with traffic, it can issue a rule or set of rules to Bridge22 that move the flow to Bridge12 instead.

An Ethernet bridge is working in "wire-speed" and therefore it is desirable that the bridge introduce as little delay as possible. Adding a Rule Engine and basing the switching on rules may increase the delay. However, a number of techniques and mechanisms can be used to make the Rule Engine more efficient:

1) Filter functions can be tested in parallel, and a priority module can select the matching rule with highest priority. These computations can be performed because the filter functions are pure predicates, i.e. they contain no side effects.
2) Filter functions will in most cases be a conjunction (or disjunction) of comparisons. These can be directly mapped onto a pipelined matrix of comparison modules in hardware.
3) A similar pipelined hardware matrix realizing the language constructs used in the action functions can be implemented.
4) Some parts of the state vector, for example library functions reflecting bridge context and resources, can be implemented in hardware such as registers, thereby providing "instant" access to them.

In the preferred embodiment, the rule language used to describe the filter and action functions is not a general purpose programming language. A programming language should only have the necessary constructs and mechanisms needed to express the solutions to the problems in the specified domain. If the language is too powerful, as a general-purpose language, it is possible to express an infinite loop (accidentally or on purpose) thereby increasing the delay to infinity. The preferred switching rule language, therefore, is a language primarily restricted to the domain of Ethernet switching (layer 2), with language constructs expressing the mechanisms used in the switching process. However, language constructs that are useful for other purposes like network management, constructs related to exchange of new rules, and so on, that are not in conflict with the basic requirements may also be included.

The present invention provides several advantages. The Ethernet standards can be implemented as switching rule sets, and as the standards evolve, the rule sets are updated. These updated rule sets can then easily be loaded into an adaptable network bridge. The rule sets can be vendor-independent and, for example, published by IEEE. Today, each vendor decides which protocols (standards) to support in a bridge, and unless the vendor issues an update whenever the standard is updated, users have to buy a new bridge if they need to follow the new standard.

In the present invention, the "programming language" of rules may be standardized thereby enabling anyone to add new functionality, as a switching rule, to any bridge with a Rule Engine. These rules can then be updated or removed if necessary. A proprietary solution can also be implemented as a rule or set of rules and loaded in any bridge with a Rule Engine. If a user later wants to use another solution, the rule set is simply replaced with a new rule set. It will be much less expensive to implement new functionality because, in most cases, the user only has to write some software in the form of a set of rules.

The present invention also greatly increases flexibility in networks because each bridge can be loaded with its own rule set down to the individual port level. The invention also provides the ability to adapt the functionality on each port based on time, user demands, service agreements, and the like. For example, different operators can share the same physical bridge (network) and provide different services to their respective users.

Some examples of functionality that can be implemented with switching rules include the following:
1) Broadcast tunnels. It is simple to implement broadcast tunnels necessary for building Public Ethernet Networks.
2) Distributed router functionality added to a set of bridges.
3) Simple firewall functionality.
4) User adapted services on the port level.
5) Authentication and security mechanisms on the port level that are transparent to users.
6) Self-managed networks or semi-self managed networks. This list is not intended to be exhaustive, and other functions may also be implemented with switching rules and loaded into any adaptable bridge with a Rule Engine.

As shown by the above examples, the state of the dynamically adaptable bridge can be utilized in the switching process to enable entirely new functionality and to provide new ways to use bridges in networks.

Although preferred embodiments of the present invention have been illustrated in the accompanying drawings and described in the foregoing Detailed Description, it is understood that the invention is not limited to the embodiments disclosed, but is capable of numerous rearrangements, modifications, and substitutions without departing from the scope of the invention. The specification contemplates any all modifications that fall within the scope of the invention defined by the following claims.

What is claimed is:

1. A dynamically adaptable network bridge, wherein the network bridge is one of a plurality of adaptable bridges in a network, said network bridge comprising the following internal components:
   a Rule Engine that processes data frames according to a set of switching rules, wherein each switching rule in the set comprises:
      a fitter function for determining whether a given switching rule is applicable to a given frame;
      an action function for determining how the given frame should be switched if the filter function determines that the given switching rule is applicable to the given frame; and
   a state vector accessible by the filter function and the action function, said state vector defining a plurality of sets of switching rules. bridge-specific data applicable to and accessible by all switching rules, a set of bridge resources for handling data frames, and context information regarding the traffic load in the bridge and other bridges in the network;
   means for dynamically modifying the switching rules, wherein when the state vector changes, the filter function applies different switching rules to the data frames and the action function switches the frames differently; and
   means for implementing a self-managed network by generating specific context rules as the traffic load on the bridge chances and distributing the context rules to other adaptable bridges in the network.

2. The dynamically adaptable network bridge of claim 1 wherein the means for dynamically modifying the switching rules includes a protocol for dynamically loading and updating the switching rules.

3. The dynamically adaptable network bridge of claim 1, wherein the state vector includes an abstraction of a local memory for storing rule-specific data for each switching rule.

4. The dynamically adaptable network bridge of claim 3, wherein specific management rules enable the Rule Engine to access the rule-specific data for each switching rule.

5. The dynamically adaptable network bridge of claim 3, wherein the state vector also includes an abstraction of a global bridge memory for storing the bridge-specific data applicable to and accessible by all the switching rules.

6. The dynamically adaptable network bridge of claim 5, wherein the bridge-specific data includes a port-forwarding table.

7. The dynamically adaptable network bridge of claim 5, wherein the state vector also includes a set of library functions that implement the bridge resources.

8. The dynamically adaptable network bridge of claim 7, wherein the set of library functions are selected from a group consisting of:
   a function that retrieves a source port of a processed frame;
   a function that provides timestamps;
   a function that describes traffic flows in the network bridge; and
   a function that indicates the traffic load in the bridge.

9. The dynamically adaptable network bridge of claim 1, wherein the given frame is processed in accordance with the given switching rule if the filter function determines that the given switching rule is applicable to the given frame, and the given frame is dropped if the filter function determines that there is no switching rule applicable to the given frame.

10. The dynamically adaptable network bridge of claim 1, wherein the network bridge includes a plurality of input/output ports, and each of the plurality of sets of switching rules, is applicable to a different port in the network bridge.

11. The dynamically adaptable network bridge of claim 1, wherein the network bridge is an Ethernet bridge.

12. The dynamically adaptable network bridge of claim 1, wherein the means for dynamically modifying the switching rules includes a protocol that dynamically adds, subtracts, and modifies the switching rules.

13. The dynamically adaptable network bridge of claim 1, further comprising means for prioritizing switching rules within each of the plurality of sets of switching rules.

14. The dynamically adaptable network bridge of claim 1, further comprising a port for receiving switching rules from a Network Management System (NMS), wherein the NMS monitors the state information for a plurality of adaptable bridges in a network, and issues switching rules that adapt the behavior of the network bridge changing network conditions.

15. A method of processing and switching data frames in an adaptable network bridge, wherein the network bridge is one of a plurality of adaptable bridges in a network, said method comprising the steps of:

defining a set of switching rules for the network bridge in a Rule Engine in the network bridge, wherein each switching rule in the set comprises:
   a filter function for determining whether a given switching rule is applicable to a given frame;
   an action function for determining how the given frame should be switched if the filter function determines that the given switching rule is applicable to the given frame; and
   a state vector accessible by the filter function and the action function, said state vector defining a plurality of sets of switching rules, bridge-specific data applicable to and accessible by all switching rules, a set of bridge resources for handling data frames, and context information regarding the traffic load in the bridge and other bridges in the network;
upon determining that one of the switching rules in the set is applicable to the given frame, processing and switching the frame according to the applicable switching rule determined by the internal Rule Engine;
dynamically modifying the switching rules, wherein when the state vector changes, the filter function applies different switching rules to the data frames and the action function switches the frames differently;
generating specific context rules as the traffic load on the bridge changes; and
distributing the context rules to other adaptable bridges in the network.

16. The method of claim 15, further comprising the steps of:
   receiving a new or modified switching rule from a Network Management System (NMS), wherein the NMS monitors the state information for the plurality of adaptable bridges in the network, and issues switching rules that adapt the behavior of the network bridge to changing network conditions; and
   processing and switching frames according to the new or modified switching rule received from the NMS.

17. The method of claim 15, wherein the network bridge is an Ethernet bridge.

* * * * *